(No Model.)
E. R. KNOWLES.
SECONDARY BATTERY.
No. 399,052. Patented Mar. 5, 1889.
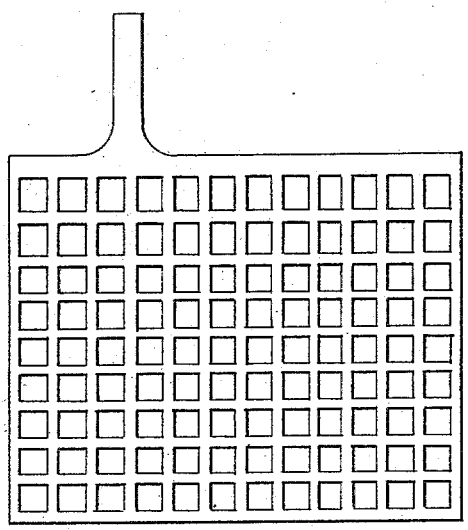
WITNESSES:
INVENTOR,
Edward R. Knowles,
BY
ATTORNEY,

UNITED STATES PATENT OFFICE.

EDWARD R. KNOWLES, OF BROOKLYN, ASSIGNOR, BY MESNE ASSIGNMENTS, TO THE MUTUAL ELECTRIC MANUFACTURING COMPANY OF NEW YORK, N. Y.

SECONDARY BATTERY.

SPECIFICATION forming part of Letters Patent No. 399,052, dated March 5, 1889.

Application filed December 1, 1888. Serial No. 292,419. (No model.)

*To all whom it may concern:*

Be it known that I, EDWARD R. KNOWLES, a citizen of the United States, residing in Brooklyn, in the county of Kings and State of New York, have invented certain new and useful Improvements in Secondary Batteries, of which the following is a specification.

My invention relates to an improved method of forming the electrodes of secondary or storage batteries, whereby the liability of distorting or buckling is obviated and the active material is rendered of such a nature as to prevent scaling or the detachment of the plugs. The finished plates also possess a degree of uniformity not found in the ordinary batteries. A plate of this description is represented in the accompanying drawing.

The plate or grid used by me may be of any shape or kind, and of any suitable material; but I prefer to use a cast grid perforated with rectangular holes, made of an alloy of lead, antimony, and tin, as it will then be stiff, light, and inoxidizable.

The active material is prepared in the following manner: I take pure red oxide of lead and treat it with a strong solution of pure sulphuric acid in water—say 15° to 30° Baumé—until all that portion of the oxide which it is possible to be acted upon by the acid is sulphated. In this step of the process the quantity of acid solution should be such that all the acid will be used up in the sulphating action, leaving nothing but water. The result is then a mixture of sulphate of lead, peroxide of lead, and water. This is dried until of the consistency of paste, and is then pasted into the grid, forming the positive plate. If, however, it is not desired or required to paste the grids immediately, the paste may be dried, pulverized, and stored until needed. When required for use, however, it should be moistened with water to bring it to a pasty condition. The negative plate is formed by treating the yellow oxide of lead in the same manner, the resulting paste being the sulphate of lead, which is pasted into the grid. The plates are then allowed to become thoroughly dried and set. The next treatment is a pickling process, and this is performed as a supplement to the above-mentioned sulphating process for the purpose of completely sulphating the oxide. I have found that a treatment of the dry oxide with a solution of sulphuric acid cannot completely sulphate the oxide, for the reason that the oxide when pulverized (and this is its condition when submitted to treatment) is more or less lumpy, each particle being made up of a number of molecules and the acid acts only on the surface of the lump, leaving a core of oxide not sulphated. When the paste is worked over and rubbed into the plates, these particles become divided and expose molecules of oxide which have not been effected by the acid. Furthermore, the pickling process also serves to cement or bind the mass of paste into a more solid and homogeneous body. The process is as follows: Both plates are slowly and carefully immersed in pure water and allowed to remain therein until they are wet through. They are then drained and immersed for some time in a weak solution of sulphuric acid and water. Next they are transferred to a similar solution, but somewhat stronger. After soaking awhile they are immersed in a strong solution of the acid and water. Here the plates are allowed to remain for a considerable time. They are finally drained and allowed to dry, when they are ready for forming. This pickling process may be carried out by mounting and connecting the plates temporarily in groups of a fixed number of positives alternating with a fixed number of negatives. For instance, a nineteen-plate cell would contain nine positives and ten negatives, there always being a negative on the outsides of each cell. These sets of plates are then treated in the manner already described—that is, with solutions of graduated strength—and finally dried. Before forming the plates are again soaked in acidulated water and then formed in the usual manner. If after the plates are pickled it is not desired to form them immediately, they may be dried and stored until needed. When they are mounted to be formed, however, they must again be soaked in acidulated water before being placed into the forming-cell.

Plates made in the manner described are, and always will be, perfectly flat and true, thoroughly and perfectly formed, never scaling or buckling, and never allowing the active material to become detached. The formed plates are porous and soft, and are of the proper color and consistency. The whole process is simple, perfectly uniform in its methods, making all the plates exactly alike, and of great economy as to first cost.

I may prepare a paste which is adapted for use on both the positive and negative plates by mixing the red and yellow oxides of lead and treating them in the manner herein described.

Having described my invention, I claim—

1. The method herein described of making secondary-battery plates, which consists in first sulphating the oxides, then pasting the same onto the grids, then pickling the grids in different solutions of acidulated water, the solutions being of gradually-increasing strength, and finally forming and mounting them for use.

2. The method herein described of making secondary-battery plates, which consists in first sulphating the oxides, then pasting the same onto the grids, allowing them to dry, then pickling the grids in different solutions of acid and water, the solutions being of gradually-increasing strength, and finally forming and mounting them for use.

3. The method herein described of making secondary-battery plates, which consists in first sulphating the oxides, then pasting the same onto the grids, then pickling the grids first in pure water and then in different solutions of acid and water, the solutions being of gradually-increasing strength, and finally forming and mounting them for use.

4. The method herein described of making secondary-battery plates, which consists in first treating the finely-divided oxides with sulphuric acid or a solution of the same until all of the oxides which it is possible to be acted upon by the acid are sulphated, then pasting the same on the grids, then pickling the grids thus prepared in different solutions of acid and water successively, the solutions being of gradually-increasing strength, and finally forming and mounting them for use.

In witness whereof I have hereunto signed my name in the presence of two subscribing witnesses.

EDWARD R. KNOWLES.

Witnesses:
WM. A. ROSENBAUM,
F. C. GRUEN.